United States Patent [19]

Bardhan et al.

[11] Patent Number: 4,725,391
[45] Date of Patent: Feb. 16, 1988

[54] METHOD OF EXTRUDING CERAMIC TUBE

[75] Inventors: Pronob Bardhan; Carlo M. Golino; Larry D. Gorges; Sandra L. Morse, all of Corning, N.Y.

[73] Assignee: Corning Glass Works, Corning, N.Y.

[21] Appl. No.: 578,841

[22] Filed: Feb. 10, 1984

[51] Int. Cl.$^4$ .................. B28B 21/52; C04B 40/02
[52] U.S. Cl. .................................. 264/82; 264/63
[58] Field of Search ............... 264/63, 82, 187, 192; 501/134, 137

[56] References Cited

U.S. PATENT DOCUMENTS

| | | | |
|---|---|---|---|
| 2,950,503 | 8/1960 | McRae | 264/85 |
| 3,789,097 | 1/1974 | Beck | 264/82 |
| 3,879,339 | 4/1975 | Richard | 164/16 |
| 3,899,554 | 8/1975 | Kaiser | 264/61 |

*Primary Examiner*—Jan H. Silbaugh
*Assistant Examiner*—Hubert C. Lorin
*Attorney, Agent, or Firm*—William J. Simmons, Jr.

[57] ABSTRACT

A method is disclosed for extruding thin-walled ceramic bodies. The method involves mixing into a homogenized batch a granular ceramic, a binder, a soluble oxidizing agent and a matrix precursor in amounts sufficient to provide a substantially water-free extrudable mixture. The batch is extruded into an atmosphere containing $SO_2$ which permeates the extrudate and reacts with the oxidizing agent to form $SO_3$ in situ. The $SO_3$ catalyzes polymerization of the furfuryl alcohol to a rigid solid which prevents deformation of the extrudate.

20 Claims, 5 Drawing Figures

METHOD OF EXTRUDING CERAMIC TUBE

BACKGROUND OF THE INVENTION

The present invention relates to a method of extruding thin-walled tubular bodies of ceramic powders. Such bodies are espeically useful for forming coaxial capacitors.

Coaxial capacitors comprise a tube of ceramic material such as $BaTiO_3$, $SrTiO_3$ or the like. Inner and outer electrodes are formed on the tube so as to be electrically insulated from each other. Means such as metal cups can be affixed to the ends of the tubular body to make electrical connection to the respective electrodes. Such capacitors and methods of making the same are taught in U.S. Pat. Nos. 4,109,292 and 4,197,570.

The volumetric efficiency of such capacitors can be increased by decreasing the wall thickness between electrodes and by increasing the electrode surface area by means such as employing a more intricate cross-sectional configuration. In the extrusion process by which the ceramic tubes are made, these geometric constraints which are needed to increase capacitance are disadvantageous in that they result in a very fragile wet extrudate. The extrudate gradually sags to a useless shape unless it can become sufficiently hardened to be self-supporting.

In the art of manufacturing bodies for coring and moulding in founding, rapid curing has been accomplished by combining the sand, particulate oxide or the like with a synthetic resin containing an acid curing agent such as a resin of the urea/formaldehyde, phenol/formaldehyde, furane or furance alcohol or by unsaturaated or epoxidised compounds. U.S. Pat. No. 3,145,438 teaches that the injection of $SO_3$ gas into the mixture of sand and resin causes an instantaneous curing of the resin in the region subjected to the action of the $SO_3$. However, such instantaneous curing impedes the diffusion of the $SO_3$ to the other parts of the mixture. The injections of $SO_2$ into the sand-resin mixture results in a very slow reaction at ambient temperature. Only a small amount of sulfur dioxide is converted to sulfuric acid by moisture in the air.

It is proposed in U.S. Pat. No. 3,879,339 that the granular filler be mixed with at least one acid curing organic resin and an oxidizing agent. After shaping the resultant mixture, the resin is cured at ambient temperature by adding gaseous or aerosol sulfur dioxide. The oxidizing agent reacts with the sulfur dioxide to form sulfuric acid in situ without forming sulfur trioxide, the action of which is said to be too violent and lacking selectively. The main aim of the invention disclosed in U.S. Pat. No. 3,879,339 is thus to form within the composition a compound which has a level of oxidation with lower reactivity than that of sulfur trioxide, which has the double disadvantage of being unstable and of combining with water to give an excessively violent reaction. Hydration of the sulfur dioxide by trace quantities of water takes place initially within the composition, followed by oxidation of the resultant sulphurous acid (or possibly hydrated $SO_2$), either by formation of free radicals or by formation of complexes. In every case, sulfuric acid forms in situ without the intermediate formation of sulfur trioxide.

SUMMARY OF THE INVENTION

It is an object of the present invention to provide a method for rapidly curing extruded bodies of granular ceramics to which no water has been added.

Briefly, the method of the present invention pertains to the extrusion of bodies of ceramic powders having at least one longitudinally-extending passage therethrough. There are combined a granular ceramic, a binder, a soluble oxidizing agent and a matrix precursor in amounts sufficient to provide a substantially water-free extrudable mixture. The matrix precursor must also be a solvent for the oxidizing agent. After the batch is homogenized, it is extruded as a deformable extrudate into an atmosphere containing $SO_2$. The $SO_2$ flows through the passage, permeates the extrudate and reacts with the oxidizing agent to form $SO_3$ in situ. The $SO_3$ catalyzes polymerization of the matrix precursor to a rigid solid matrix which substantially prevents deformation of the extrudate.

DESCRIPTION OF THE PREFERRED EMBODIMENT

Figure 1:
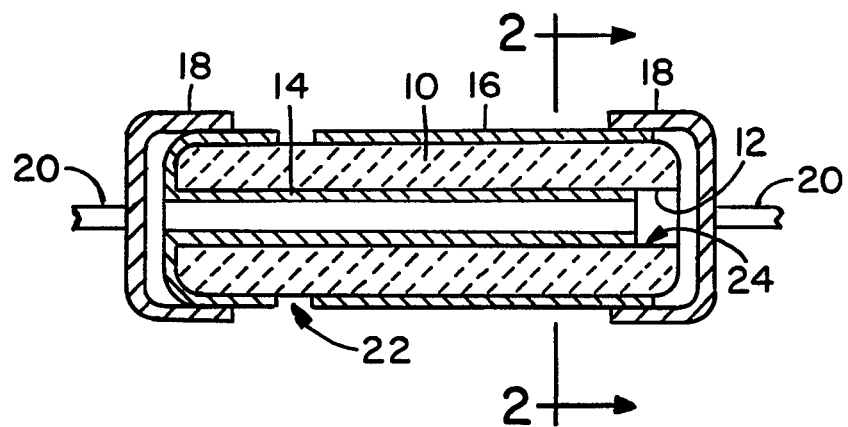
FIG. 1 is an axial cross-sectional view of a conventional tubular capacitor.
Figure 2:
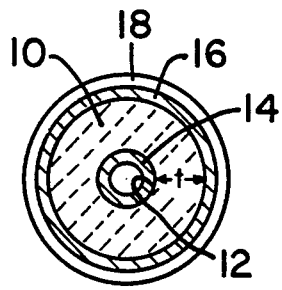
FIG. 2 is a cross-sectional view taken at lines 2—2 of FIG. 1.

FIG. 1 illustrates a conventional tubular ceramic capacitor comprising a tube 10 of ceramic dielectric material having an aperture 12 therethrough. Tube 10 has an inner electrode 14 and an outer electrode 16 thereon. A pair of metal caps 18 is pressed onto the opposite ends of the coated ceramic tube in mechanical and electrical contact with the electrodes, and wire leads 20 may be electrically connected to caps 18 to electrically connect the capacitor to external circuitry.

Tube 10 is formed by extruding and then firing a suitable ceramic dielectric material which may be composed of granular high dielectric constant ceramic material admixed with a binder and optionally containing other ingredients to facilitate extrusion. Suitable ceramic materials include but are not limited to $BaTiO_3$, $SrTiO_3$, $Nb_3O_5$ and mixtures thereof. The size range of powder particles for use as a capacitor dielectric is preferably 0.5 to 4.0 $\mu$m, with an average size of about 1.0 $\mu$m. Some larger particles will usually be present (generally less than 10 wt. % will be in the 4 to 10 $\mu$m range). In the extrusion of very thin walled bodies, it is desirable to keep the maximum particle diameter at about 0.1 to 0.05 times the minimum wall thickness. For example, the maximum particle size range would be 7.5 to 15 $\mu$m for a body having a minimum wall thickness of 0.15 mm.

The extrudate is cut into tubes of suitable length, fired, and the tube ends are rounded by grinding for smooth insertion into the metal caps 18. The inner and outer electrodes may be applied by any suitable technique such as silver paint or a mixture of powdered silver, glass frit, resin and solvent. Tube 10 may be initially metallized over the entire inner and outer surface thereof, gaps 22 and 24 thereafter being formed by removing a portion of the deposited metal layer by means such as grinding, laser burning or the like.

Figure 3:
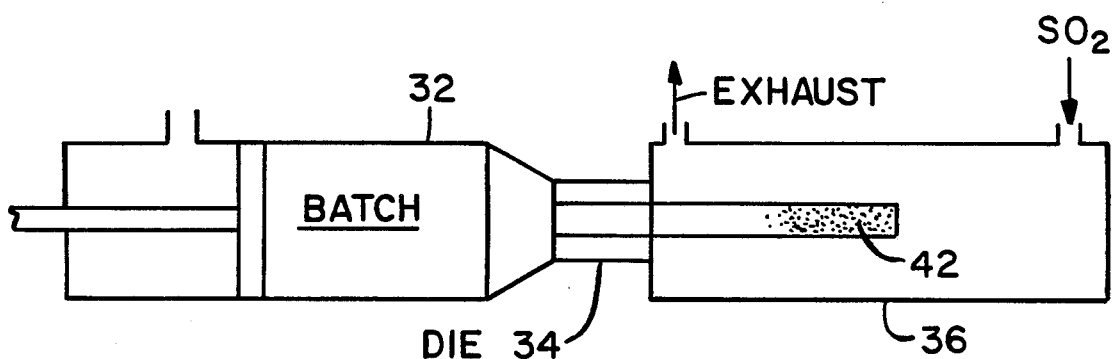
FIG. 3 is a diagramatic illustration of an extrusion apparatus for performing the method of the invention.

Commercial tubular capacitors of the type illustrated in FIGS. 1 and 3 typically employ ceramic tubes having a length in the range of 4–10 mm, an outer diameter in the range 3–5 mm and an inner diameter in the range 1.5–3.0 mm. The capacitance of such a device can be increased by decreasing the thickness t of the tube wall; however, wall thickness cannot easily be decreased to less than about 0.5 mm when formed by conventional extrusion techniques. Attempts to form tubes having thinner walls have resulted in the sagging of the wet extrudate with the result that such tubes are unsuitable for use in capacitor manufacture. At a wall thickness of about 0.25 mm, extrudate wet strength begins to decrease very rapidly.

In accordance with the present invention a modified batch is extruded directly into a gaseous medium which reacts with the batch and rapidly converts it to a rigid polymeric solid. The cured organic matrix must be one which chars or decomposes prior to melting during the firing process. The extrusion batch is formed by combining in mixing means such as a muller the various batch ingredients. The amount of each ingredient to be added to the ceramaic dielectric powder will be specified in terms of the percent by weight of that ingredient as compared with the weight of the ceramic powder.

To the ceramic powder is added about 2–4% of a temporary binder. If the binder level is too low the batch becomes too brittle and stiff and cannot flow through the die. If too much binder is employed, the extruded batch becomes porous when fired. Examples of suitable binders are methyl cellulose, ethyl cellulose, hydroxypropyl cellulose, hydroxybutyl cellulose, and combinations of methyl cellulose and any of the remaining cellulose derivatives. Also, non-cellulose derivatives such as starch and acrylonitrile copolymers may be employed.

To the dry mixture of the ceramic powder and binder is added an oxidizing agent which may be present in amounts of 3–15 wt. %. A preferred oxidizing agent is methyl ethyl ketone (MEK) peroxide. Other suitable oxidizing agents may be employed such as hydrogen peroxide di-t-butyl peroxide, organic hydroperoxides such as t-butyl hydroperoxide and organic peresters such as esters of perbenzoic acid.

To the resultant mixture is added 15–35 wt. % of a matrix precursor to form a plasticized batch, i.e. an extremely viscous solution of a partially solvated (or dissolved) binder in the matrix precursor and MEK peroxide which suspends particles of the ceramic powder. A preferred matrix precursor is furfuryl alcohol; however, oligomers or polymers of furfuryl alcohol and possibly copolymers of furfuryl alcohol and some similar organic monomer can be employed. The plasticized batch is transferred to an extruder barrel where it is preferably extruded as spaghetti two or three times to homogenize the batch. A suitable die for forming the desired tubular structure is then mounted on the end of the extruder barrel, and the homogenized batch is extruded into the desired tubular shape.

A horizontal extrusion apparatus is diagramatically illustrated in FIG. 3. The homogenized plasticized batch is placed in extruder barrel 32. The batch is extruded through die 34 into curing chamber 36 into which an $SO_2$-containing atmosphere is flowed. The term "$SO_2$-containing atmosphere" means an atmosphere of pure $SO_2$ or one containing $SO_2$ and another gas which does not adversely affect the extrudate, i.e. a gas such as air or an inert gas. Whereas the inlet and outlet pipes are shown as being at opposite ends of the chamber, they could also be positioned at other suitable locations such as at the top and bottom thereof. Not shown is conveyor and cutting means which may be located in chamber 36 for conveying the extrudate away from the die face at the rate at which tube 40 is being extruded. As extruded tube 40 enters chamber 36, $SO_2$ gas envelopes the tube and flows into passage 12. The $SO_2$ permeates the tube walls and reacts with the oxidizing agent therein to yield $SO_3$. The $SO_3$ catalyzes polymerization of the matrix precursor to yield a rigid solid, thus making the extrudate rigid so that it resists deformation. In less than two seconds the extruded tube becomes cured, the cured tube being illustrated by dotted region 42. Since the $SO_2$ itself has little effect on the extrudate, it can permeate the entire thickness of the extrudate walls. Since the $SO_3$ is formed in situ, there is not a rapid curing at the exterior surface of the tube to prevent further migration of curing gas into the extrudate. Rather, the $SO_3$, which is formed internally, substantially uniformly cures the extrudate.

The minimum amount of $SO_2$ required is that amount which can react with all of the active oxygen in the oxidizing agent which has been added to the batch. The amount of active oxygen in a particular oxidizing agent can be determined experimentally. For example, the MEK peroxide used in the specific example described hereinbelow contains 9 wt. % active oxygen. In a batch containing 1000 gm ceramic powder, 4 wt. % MEK peroxide will require a total of 0.2 cu. ft. $SO_2$. For a given extrusion rate the total extrusion time for the batch can be determined. The rate at which this minimum amount of $SO_2$ is flowed into chamber 36 can be determined by dividing the minimum amount of $SO_2$ by the total extrusion time. Since much of the $SO_2$ flowed into chamber 36 is exhausted without contacting the extrudate, it is preferred that at least three times the minimum calculated amount of $SO_2$ be employed. For experimental purposes, at least 10 times the minimum calculated amount of $SO_2$ was employed to ensure that all of the active oxygen from the MEK peroxide was reacted.

When forming cylindrically symmetric bodies, it is advantageous to employ vertical extrusion, since gravitational distortion of a vertically extended cylinder produces symmetrical elongation. Horizontal extrusion differs in that sagging causes the circular cross-section to become oval in shape. However, even the symmetrical elongation produced during vertical extrusion is detrimental since the resulting variations in wall thickness lead to variations in strength and capacitance values. Rapid curing during extrusion will prevent both types of distortion.

Figure 4:
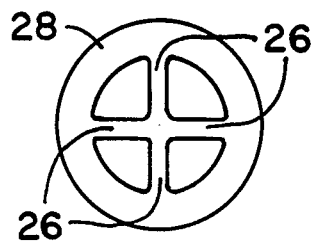
FIGS. 4 and 5 exemplify other tube cross-sections which can be formed in accordance with the present invention.
Figure 5:
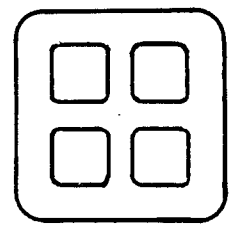

As the wall thickness of the extruded tube decreases, it may become desirable to add fins or other internal support structure as illustrated in FIG. 4 to further increase the volume efficiency of the tube in capacitor applications. The minimum wall thickness of such a tubular body may be the thickness of fins 26 if they are thinner than the outside wall 28. As shown in FIG. 5, the tubular body may intentionally deviate from the circular configuration conventionally employed in tubular capacitors. As used herein, the terms tubular and tube refer to any elongated article having one or more longitudinally-extending passages therein.

The magnitude of the cure rates required can be illustrated as follows. If an extrusion rate of about six inches per second is assumed, then a substantial cure, i.e. a three-fold to four-fold increase in wet strength in less then two seconds will permit the extruded tube to be mechanically handled and cut about one foot from the die face. Thin-walled extrudates (those having wall thicknesses less than about 0.5 mm) suffer significant gravitational distortion within two feet of the die face without the aforementioned curing.

The following example is illustrative of the method of the present invention. The percentages given below are based on the weight of barium titanate used. Electronic grade barium titanate was dry blended with 3 wt. % methyl cellulose [Dow Chemical A4M Methocel (TM)]. This dry blend was placed in a double wheel muller, and to it was added, in the following order: 4 wt. % of a 50%/50% (v/v) solution of methyl ethyl ketone peroxide and dimethyl phthalate; then 16 wt. % furfuryl alcohol (chilled liquid). Finally, near the end of the mulling cycle, a small, additional portion (typically 0.5 to 1.5 wt. %) furfuryl alcohol was added to adjust the batch such that the final pre-extrusion (spaghetti) pressure was maintained at a value less than about 800 psi at a ram speed of approximately 9 inches per minute.

The mulled batch was pre-extruded three times through a 0.13 inch spaghetti die. Following the pre-extrusions, the batch was extruded at a rate of about 24 in/sec through a tube-forming die, yielding a length of sample suitable for the formation of tubular capacitors. On-line curing of the tubular extrudate was effected by extruding the sample directly into a horizontal chamber, the volume of which was about 0.05 cu. ft. (1.5 inch inside diameter by 48 inch length). The chamber was supplied with pure $SO_2$ at a flow rate of 50 SCFH. The $SO_2$ permeated the walls of the extruded tube and was oxidized to $SO_3$. The furfuryl alcohol was polymerized by the $SO_3$, and a coloration indicative of cure occurred within several seconds. A considerable increase in wet strength was observed, indicating at least a partial cure within the time frame mentioned. This strength was adequate for handling the extrudate without causing distortion.

We claim:

1. A method of extruding ceramic bodies having at least one longitudinally-extending passage therethrough and including at least one wall, the thickness of which sufficiently small that it would tend to deform under its own weight, said method comprising
   combining a granular ceramic, a binder, a matrix precursor and an oxidizing agent that is soluble in said matrix precursor in amounts sufficient to provide a substantially water-free extrudable batch,
   homogenizing said batch, and
   extruding said batch as a deformable extrudate into an atmosphere containing $SO_2$, said $SO_2$ flowing into said at least one passage, permeating said extrudate and reacting with said oxidizing agent to form $SO_3$ in situ, said $SO_3$ catalyzing polymerization of said matrix precursor to a rigid solid, said atmosphere containing an amount of $SO_2$ that is sufficient to substantially prevent deformation of said extrudates.

2. A method in accordance with claim 1 wherein the step of extruding said batch into an atmosphere containing $SO_2$ comprises extruding said batch into a chamber, flowing $SO_2$ into said chamber, and exhausting reaction products from said chamber.

3. A method in accordance with claim 2 wherein the step of flowing $SO_2$ into said chamber comprises flowing said $SO_2$ at a rate sufficient to react with all of the active oxygen in the oxidizing agent present in the extrudate.

4. A method in accordance with claim 1 wherein said oxidizing agent which is added to said batch during the step of combining is selected from the group consisting of organic peroxides, organic peresters and hydrogen peroxide.

5. A method in accordance with claim 4 wherein said oxidizing agent is methyl ethyl ketone peroxide.

6. A method in accordance with claim 5 wherein said matrix precursor which is added to said batch during the step of combining comprises furfuryl alcohol.

7. A method in accordance with claim 5 wherein said matrix precursor which is added to said batch during the step of combining comprises oligomers of furfuryl alcohol.

8. A method in accordance with claim 5 wherein said matrix precursor which is added to said batch during the step of combining comprises polymers of furfuryl alcohol.

9. A method in accordance with claim 1 wherein said binder which is added to said batch in said step of combining comprises methyl cellulose.

10. A method in accordance with claim 1 wherein said binder which is added to said batch in the step of combining comprises ethyl cellulose.

11. A method in accordance with claim 1 wherein said binder which is added to said batch in said step of combining comprises hydroxypropyl cellulose.

12. A method in accordance with claim 1 wherein said binder which is added to said batch in the step of combining comprises hydroxybutyl cellulose.

13. A method in accordance with claim 1 wherein said binder which is added to said batch in the step of combining comprises starch.

14. A method of extruding ceramic bodies having at least one longitudinally-extending passage therethrough and including at least one wall, the thickness of which is less than 0.5 mm, said method comprising
    combining a granular ceramic, a binder, furfuryl alcohol in said furfuryl alcohol in amounts sufficient to provide a substantially water-free extrudable batch,
    homogenizing said batch,
    providing an elongated chamber,
    flowing an $SO_2$-containing atmosphere into said chamber,
    venting the atmosphere from said chamber, and
    extruding said batch as a deformable extrudate into one end of said chamber, said $SO_2$ flowing into said at least one passage, permeating said extrudate and reacting with said oxidizing agent to form $SO_3$ in situ, said $SO_3$ catalyzing polymerization of said furfuryl alcohol to a rigid solid.

15. A method in accordance with claim 14 wherein the step of flowing and $SO_2$-containing atmosphere into said chamber comprises flowing pure $SO_2$ into said chamber.

16. A method in accordance with claim 14 wherein the step of flowing $SO_2$ into said chamber comprises flowing said $SO_2$ at a rate sufficient to react with all of the active oxygen in the oxidizing agent present in the extrudate.

17. A method in accordance with claim 14 wherein said oxidizing agent which is added to said batch during the step of combining is selected from the group consisting of organic peroxides, organic peresters and hydrogen peroxide.

18. A method in accordance with claim 17 wherein said oxidizing agent is methyl ethyl ketone peroxide.

19. A method in accordance with claim 14 wherein said binder which is added to said batch in said step of combining comprises methyl cellulose.

20. A method in accordance with claim 14 wherein said binder which is added to said batch in said step of combining comprises ethyl cellulose.

* * * * *